Jan. 27, 1953   J. KINSELLA ET AL   2,627,012
HEATING OF SURFACES BY LAMINATED FOIL RESISTANCE
ELEMENTS WITH TIMED CONNECTING MEANS
Filed Aug. 5, 1950   3 Sheets-Sheet 1
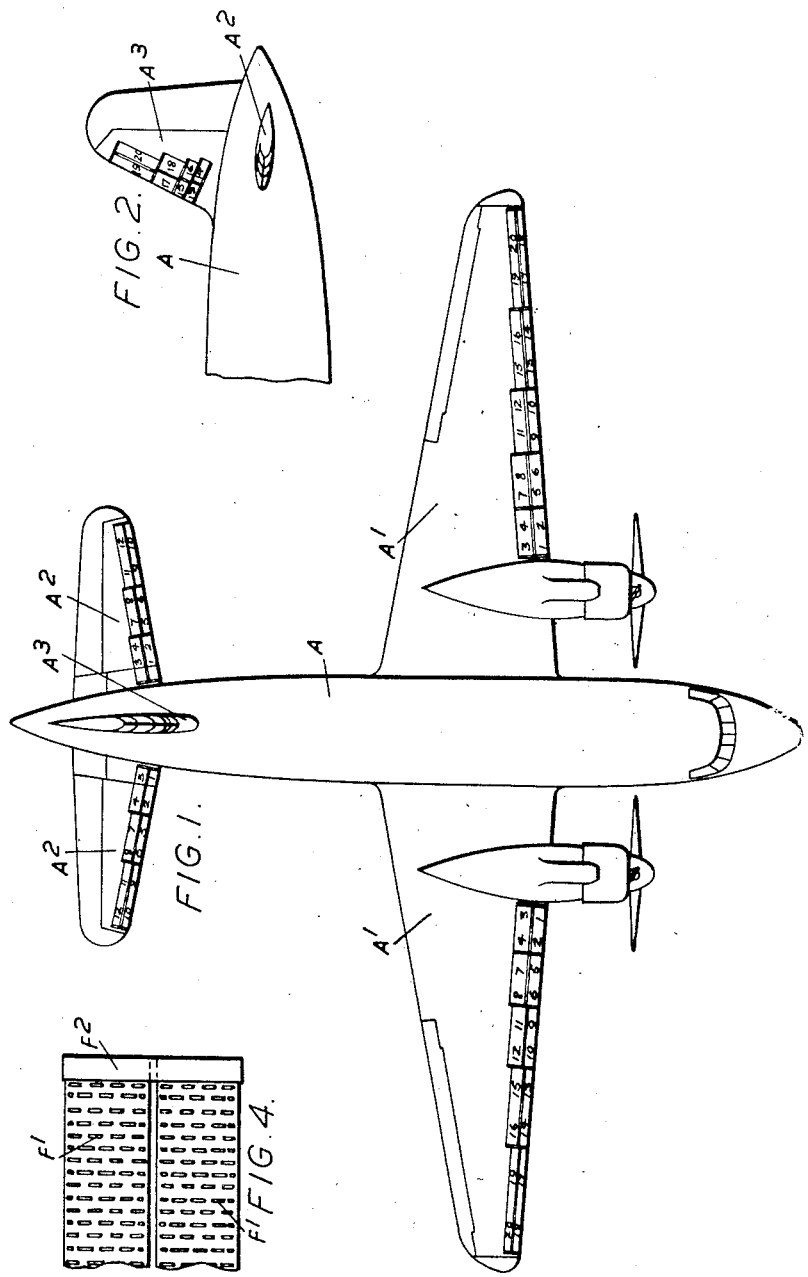
Inventor
JOHN KINSELLA
ERNEST O. ROBERTSON
By Emery Holcombe & Blair
Attorneys

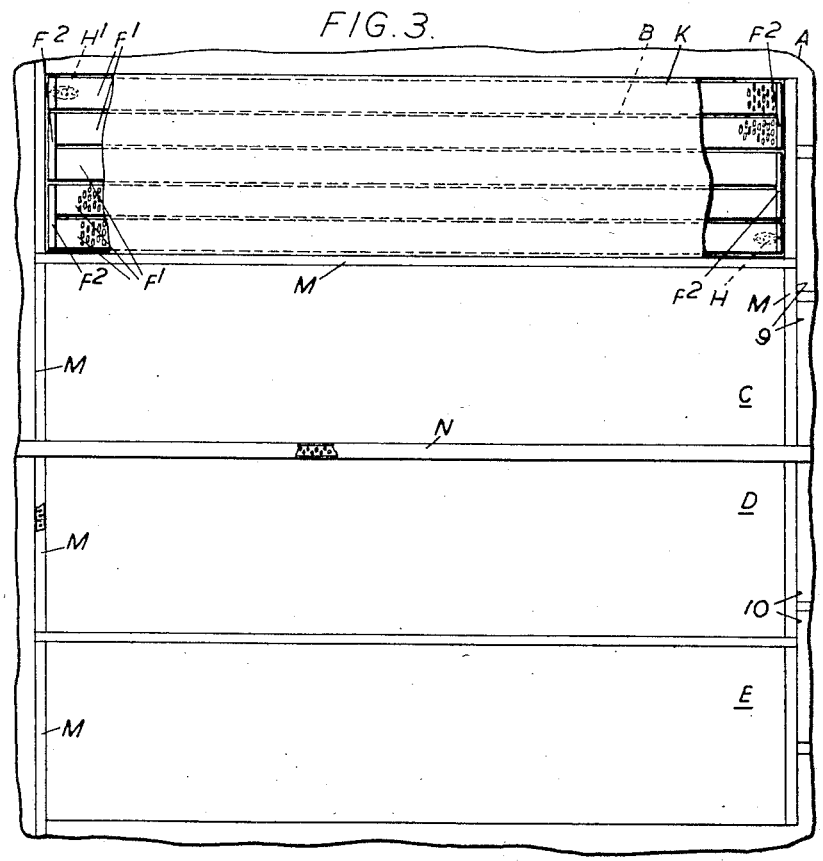
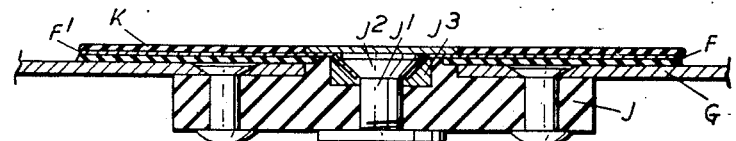
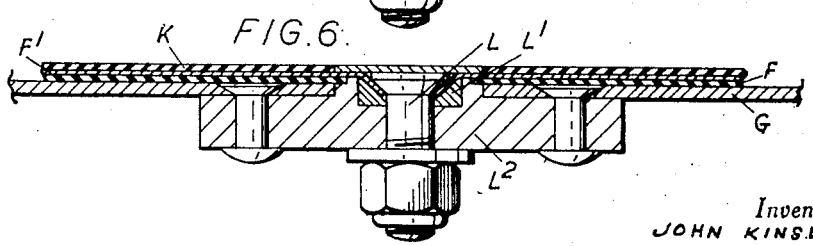

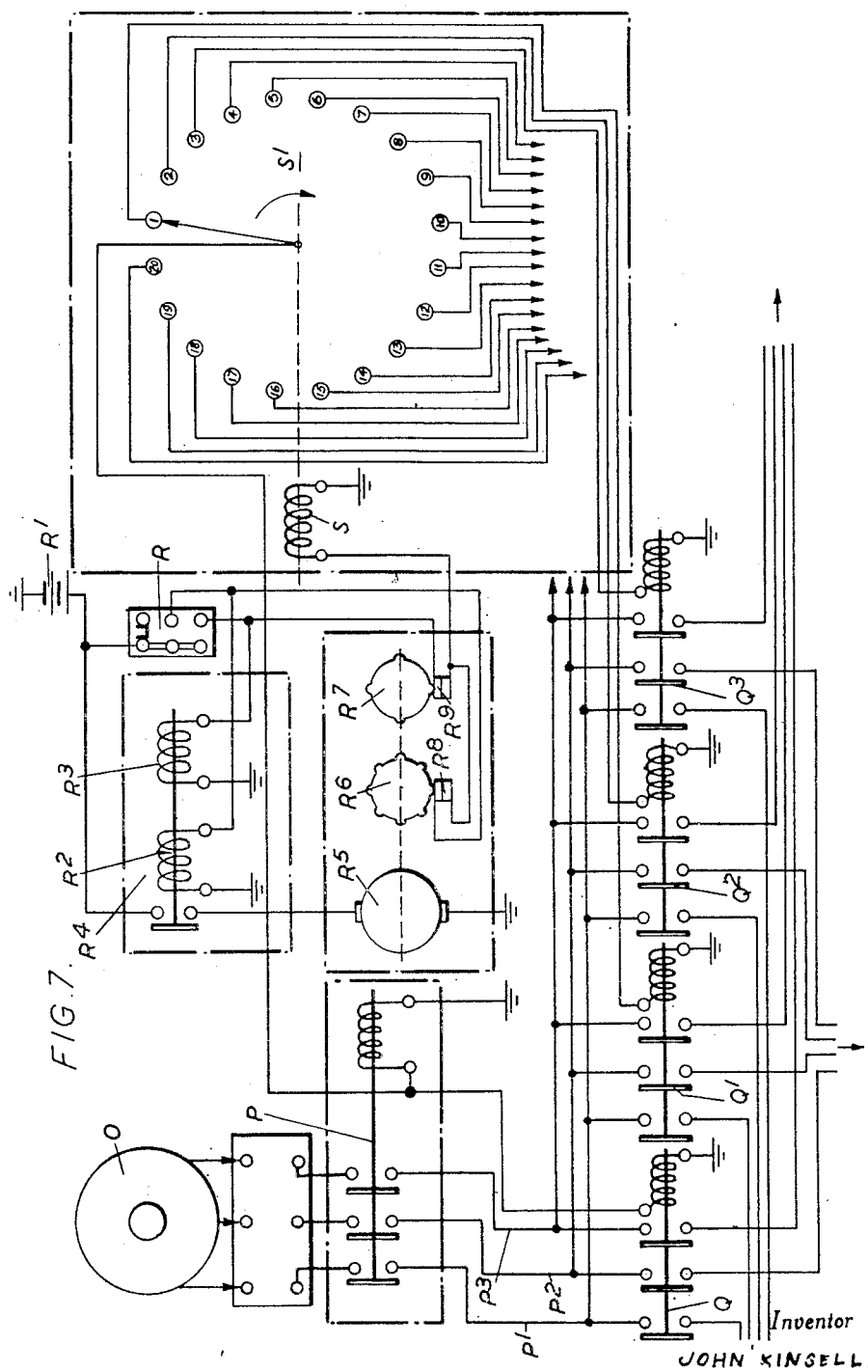

Patented Jan. 27, 1953

2,627,012

UNITED STATES PATENT OFFICE 2,627,012

HEATING OF SURFACES BY LAMINATED FOIL RESISTANCE ELEMENTS WITH TIMED CONNECTING MEANS

John Kinsella and Ernest Owen Robertson, Luton, England, assignors to D. Napier & Son Limited, London, England, a British company, and The English Electric Company Limited, London, England, a British company Application August 5, 1950, Serial No. 177,882
In Great Britain June 21, 1949

6 Claims. (Cl. 219—19)

This invention relates to the heating of surfaces and is especially but not exclusively applicable to the heating of surfaces on aircraft to prevent the formation of or to effect the removal of ice which may tend to accumulate thereon under certain conditions.

Various proposals have been made for removing ice from the surfaces of aircraft on which it tends to form, for example from the leading edge portions of supporting or control surfaces, air intakes or other parts on which the air tends to impinge during flight. Some of these prior proposals have involved the use of mechanism which increased the weight and complication of the aircraft to an undesirable degree, others made use of a so-called de-icing liquid of which only a limited quantity could be carried without increasing the weight of the aircraft to a degree which could not be tolerated, while others necessitated or produced changes in the contour of the surfaces to which they were applied and were thus undesirable for aerodynamic reasons.

It will be appreciated that it is of great importance to provide the best aerodynamic contour for the parts of aircraft on which the air impinges, and particularly so for the main supporting planes and control surfaces, and that the higher the speed of the aircraft, the greater becomes the importance of having the correct contour for such parts.

An object of the present invention is to provide means for heating surfaces, such as the surfaces of an aircraft on which ice is liable to accumulate, which will be capable of application to existing surfaces as well as during manufacture of such surfaces, and which will add comparatively little to the weight of the part to which they are applied and, when applied to existing surfaces, will not alter to any great degree the contour of such surfaces.

According to the present invention electrical heating apparatus comprises a thin sheet of foil of conducting metal interposed between and attached to insulating layers and arranged to act as a resistance element through which electric current can be passed to heat it.

The thickness of the thin sheet of conducting metal (which for convenience will hereinafter be referred to as metal foil) may vary according to the metal of which it is formed, its dimensions and configuration and the manner in which it is connected to the source of electric current, that is to say to the length and cross-section of the path or paths for the flow of electric current through it between the terminals, and other considerations, but in any case the metal foil preferably has a series of perforations formed therein so that it forms a somewhat grid-like structure. This not only reduces the cross-section for the passage of current through the metal foil but in addition enables the layers of insulating material on the two sides of it to be united to one another and through the perforations so as to form a satisfactory unitary structure.

Usually opposite ends or edges of the sheet of foil will be connected to the opposite poles of the source of current and the perforations will be so arranged that the path for current flow from any point at one end of the perforated sheet to any point at the other is a sinuous path. Moreover, the perforations are preferably wider than they are long, measured in the general direction of current flow through the perforated sheet. For convenience the direction of current flow will be regarded herein as from end to end of the perforated sheet and the term "end" is to be correspondingly interpreted.

The insulating layer which lies in contact with the surface to which the heating apparatus according to the invention is applied is either formed on or rigidly attached to that surface and is preferably chosen so as to be not only electrically insulating, as is necessary, but also so as to have heat-insulating properties whereby the transfer of heat from the perforated sheet to the element to which the heating apparatus is applied is reduced. The outer insulating layer is on the other hand preferably chosen so as not only to have the required essential electrical insulating properties but to have good mechanical strength or resistance to damage so that it serves as a protective layer for the perforated sheet.

In applying heating apparatus according to the invention to a surface the heating apparatus may if desired be made up as a unit or mat consisting of the two insulating layers with the perforated metal sheet between them, such mat being applied to the surface of the member on which the heating apparatus is to be used and secured thereto as by adhesive or other means. In other cases the heating apparatus might be assembled on the surface of the member which is to carry it by first applying to such surface an insulating layer as by spraying or brushing or attaching a preformed layer of insulating material by adhesive, then applying the perforated metal sheet, and finally applying the outer insulating or protective layer either as a coat applied by spraying or brushing or by securing a preformed insulating layer by adhesive over the perforated metal sheet, the outer insulating layer in either case adhering not only to the perforated metal sheet but also to the parts of the other insulating layer exposed through the perforations in the metal sheet.

As stated, the invention is particularly applicable to heating apparatus for use on the surfaces of aircraft on which ice is liable to accumulate under certain atmospheric conditions, and one arrangement according to the invention suitable for this purpose is illustrated by way of example somewhat diagrammatically in the accompanying drawings, in which Figure 1 is a diagrammatic plan view of a complete aircraft showing the various sections of the leading edges of parts thereof to which heating apparatus according to the invention may be applied for de-icing purposes, Figure 2 is a side elevation showing the manner in which the heating apparatus is applied to the tail fin of the aircraft shown in Figure 1, Figure 3 is a plan view on an enlarged scale of one section of the heating apparatus as applied to the aircraft shown in Figures 1 and 2, the outer layer of insulating material being partly broken away to show certain features, Figure 4 is an enlarged view of the adjacent ends of two perforated metal sheets embodied in the section of the heating apparatus shown in Figure 3, Figure 5 is a sectional side elevation on a much enlarged scale showing the manner in which the appropriate perforated metal sheet in the heating apparatus shown in Figures 3 and 4 is connected to one side of the source of electric current, Figure 6 is a similar view to Figure 5 showing the method used in the apparatus shown in Figures 3 and 4 for connecting the appropriate perforated metal sheet to the other side of the source of electric current, and Figure 7 is a diagram showing the electric circuit arrangements for supplying current to the various sections of the heating apparatus employed on the aircraft shown in Figures 1 and 2.

In the form of the invention shown in the drawings the aircraft A has heating apparatus according to the invention applied to the leading edges of its main wings $A^1$, its tail plane $A^2$ and its tail fin $A^3$, the heating apparatus comprising a series of sections which for convenience have been indicated by numbers, each of these sections being heated at timtd intervals when the apparatus is in operation by electric current supplied to the different sections in succession in a manner hereinafter described and so that the sections indicated by the same numerals are supplied with current simultaneously and the various sections are heated in numerical order; that is to say all the sections numbered 1 are first heated, then the electric current is cut off from those sections and applied to all the sections marked 2, then to all the sections marked 3, and so on until all the sections have been heated whereupon the heating cycle starts again with the sections numbered 1.

In the illustration in Figure 1 the odd numbers are used to indicate in each case a section of area on the upper surface of a wing and the even numbers to indicate the corresponding areas on the lower surface, while in the case of the tail fin each number indicates both a surface on one side of the fin and the corresponding surface on the other side of the fin.

Figure 3 is a plan view partly broken away of the sections 5 and 6 of the heating apparatus each of which comprises as shown two sub-sections, the four sub-sections being indicated respectively by the reference letters B, C, D and E. Each of the sub-sections comprises a layer of insulating material F conveniently in the form of thin sponge rubber sheeting applied and caused to adhere to the metal skin G of the wing, five similar strips of perforated metal foil $F^1$ arranged side by side so as substantially to cover the layer of insulating material F but so as to be spaced from one another by small insulating gaps, connecting pieces $F^2$ between one end of each perforated strip of foil and the adjacent end of its neighbour so that the strips together form a conducting path of zigzag form as shown, and means, indicated in Figure 3 at H, $H^1$ for connecting the ends of the strips constituting the ends of the zigzag conducting path respectively to the two sides of a source of electric current. The strips $F^2$ act not only as connectors between the adjacent ends of the strips $F^1$ but also as distributing conductors which ensure that each of the strips is of substantially the same electrical potential throughout its width.

The width of the strips $F^1$ is the same in each section and the sections are of such areas that the sum of the lengths of the strips in each section is approximately the same, so that the total heating capacity and electrical resistance of each section is similarly the same.

As shown, the perforations in the strips of metal foil are wider than they are long considered in the direction of the length of the strips and are formed so that the path for current flow from any point at one end of a strip to any point at the other end of the strip is a sinuous path.

The connector H is shown in Figure 5 and comprises an insulating block J secured, as by riveting to the metal skin G of the wing and carrying a screwthreaded contact pin $J^1$ having a frusto-conical head $J^2$ engaging a countersunk hole in a metal washer $J^3$, the pin passing through a hole in the metal foil so that a part of the metal foil is clamped between the frusto-conical head $J^2$ and the washer $J^3$ as shown. The pin $J^1$ is screwthreaded to receive a nut $J^4$ by which it is clamped to the insulating block J and in addition to receive a self-locking nut $J^5$ by which it is connected to the end of an electric conductor $J^6$ by which one end of the perforated metal strip can thus be connected to the source of electric current.

The connector $H^1$ on the other hand serves merely to connect the appropriate end of the perforated metal strip to the metal skin of the wing, which constitutes a common earth in permanent electrical communication with the other side of the source of electric current. Thus the wiring system used is of the single-wire type employing the metallic skin and the body of the aircraft as a common earth whereby each section of the heating apparatus requires only one electrical conductor to feed it with electric current.

As will be seen the arrangement shown in Figure 6 employs a pin L similar to the pin J but shorter, between the frusto-conical head of which and a washer $L^1$ a part of the appropriate perforated metal strip is clamped. In this case, however, instead of an insulating block J a metal block $L^2$ is used so that the metal strip is directly connected to the metal skin G of the wing.

An insulating and protective layer K, for example of thin sheet rubber, is applied to the outer surface of the strips of metal foil constituting each section, this insulating layer K being caused to adhere as by adhesive or bonding to the perforated metal strips and through the perforations in such strips to the layer of sponge rubber F constituting the inner insulating layer.

Each of the sub-sections constructed as described above is seperated from its neighbour by a narrow strip M comprising an inner layer of sponge rubber or the like, a narrow perforated metal strip and an outer layer of sheet rubber or the like constituting a narrow strip-like heating unit according to the invention, while a similar narrow strip-like heating element N is formed along the extreme leading edge of each wing. In the manner hereinafter described these strip-like heating elements are supplied with electric current continuously when the apparatus is in operation, and it will thus be seen that the surface of each wing to which the heating apparatus is applied is divided into a number of intermittently heated sections separated from one another by narrow strip-like continually heated heating elements.

The equipment for supplying current to the heating apparatus is shown diagrammatically in Figure 7 and comprises a three phase alternator O arranged to be driven by the engine or one of the engines of the aircraft and to be connected by a master relay switch P to three main conductors $P^1$, $P^2$, $P^3$ hereinafter called the power lines. The distribution of alternating current to the various sections of the heating apparatus is controlled by additional relay switches Q, $Q^1$, $Q^2$, $Q^3$, etc. each of which is arranged when its operating coil is energised to connect the power lines $P^1$, $P^2$, $P^3$, to associated parts of the heating apparatus. Thus the relay switch Q is arranged to connect the power lines to all the strip-like heating elements lying between the sections and along the leading edges of the wings, tail and fin, while the relay switches $Q^1$, $Q^2$, $Q^3$, etc. are arranged to connect the power lines respectively to the numbered sections of the heating apparatus, each relay switch controlling a connection to all the sections bearing the same number in Figure 1.

The means for bringing the various relay switches into operation in the desired manner comprises a hand operated master switch indicated at R connected to a source of low voltage, indicated at $R^1$, and, when closed, serving to energise one or other of the two operating coils $R^2$, $R^3$ of a relay switch $R^4$ by which the low voltage source $R^1$ is connected to an electric motor $R^5$ driving, through appropriate gearing, two cams shown at $R^6$ and $R^7$ arranged so as to close intermittently respectively contacts indicated at $R^8$ and $R^9$. The switch R has two closing positions in one of which it energises the coil $R^2$ and connects one of the contacts $R^8$ into circuit while in the other it energises the coil $R^3$ and connects one of the contacts $R^9$ into circuit. Energisation of either of the coils $R^2$, $R^3$ will close the relay switch $R^4$.

Further, closing of the switch R energises the coil of the relay switch P and also the coil of the relay switch Q so that these two relay switches are closed. Thus the power lines $P^1$, $P^2$ and $P^3$ are rendered "live" and are connected by the relay switch Q continuously to the appropriate strip-like heating elements.

The contacts $R^8$ and $R^9$ are arranged to control the energising coil S of a step by step distributing switch $S^1$ having 20 contact points, each of which is connected to the energising coil of one of the relay switches $Q^1$, $Q^2$, $Q^3$, etc. of which for convenience only three are shown. Thus, assuming that the switch R is closed to bring one of the contacts $R^8$ into circuit, each time one of the lobes of the cam $R^6$ closes the contacts $R^8$ the coil S will be energised and the arm of the distributing switch $S^1$ will be moved on one step. Similarly if the switch R is moved into the position in which it brings one of the contacts $R^9$ into circuit, then the operating coil S will be energised only each time one of the lobes of the cams $R^7$ closes the contact $R^9$.

Since the cam $R^6$ has double the number of lobes of the cam $R^7$ it will be seen that the period between the step by step movements of the distributing switch $S^1$ will be twice as long with the contacts $R^9$ operative as it is when the contacts $R^8$ are operative.

Moreover, it will be seen that during the period when the arm of the switch $S^1$ makes contact with any one of the contacts 1 to 20, the coil of the corresponding relay switch $Q^1$, $Q^2$, $Q^3$, etc. will be energised and that that relay switch will be closed so as to cause current to be supplied from the power lines to the appropriate corresponding sections of the heating apparatus. When the arm of the switch $S^1$ is moved onto the next contact, current will be cut off from the sections of the heating apparatus just heated and will be supplied for an equivalent period to the next sections of the heating apparatus, and so on.

Thus while the narrow strips between sections of the heating apparatus are permanently heated, the different sections of the heating apparatus are heated in series, each section being heated for a period depending upon whether the contacts $R^8$ or $R^9$ are at the moment rendered operative by the switch R, and with a correspondingly smaller or greater interval between the successive heating periods of the same sections.

What we claim as our invention and desire to secure by Letters Patent is:

1. Heating apparatus for preventing the formation of ice on the parts of an aircraft comprising a series of heating elements each consisting of a thin sheet of foil of conducting material having a series of perforations formed therethrough and layers of insulating material arranged on opposite sides of the thin perforated sheet and united to the perforated sheet and to one another through the perforations in the sheet to form a unitary structure and means for connecting the heating elements at timed intervals and in series to a source of electric current.

2. Heating apparatus for preventing the formation of ice on the parts of aircraft as claimed in claim 1, in which at least two of the heating elements are arranged adjacent to one another with their adjacent sides separated by a gap in which lies a further heating element of strip-like form, and means are provided for connecting the strip-like heating element continuously to the source of electric current while the other heating elements are so connected in series at timed intervals.

3. Heating apparatus for preventing the formation of ice on the parts of aircraft as claimed in claim 2, in which the means for connecting the heating elements in series and at timed intervals to the source of electric current includes means whereby the period during which each heating element is connected to the source of electric current and the time intervals between successive connections of the same heating element to the source of electric current can be varied.

4. Heating apparatus for preventing the formation of ice on an aircraft comprising a series of heating elements, each element consisting of at least two strips of thin conducting foil having perforations formed therethrough the strips being arranged parallel to one another side by side with a small insulating gap between them, means for electrically connecting one end of each strip to the proximate end of an adjacent strip, layers of electrically insulating material between which lie the strips of foil, these layers adhering to the foil and being united to each other through the perforations in the foil, and means for connecting the ends of the strips which are not electrically connected to each other to a source of electric current so that the strips of foil act as resistance heating elements connected in series with one another, wherein the areas covered by each of certain of the elements above described is different from that covered by each of certain others and narrow strip-like heating elements lying between certain adjacent heating elements and means are provided for connecting the narrow strip-like heating elements continuously to the source of electric current while the other heating elements are connected to such source in series at timed intervals.

5. Heating apparatus for preventing the formation of ice on the parts of aircraft as claimed in claim 4, in which one of the strip-like heating elements extends along the extreme leading edge portion of the surface of an aerofoil between heating elements disposed respectively on the upper and lower parts of the surface immediately above and below such extreme leading edge portion.

6. Heating apparatus for preventing the formation of ice on an aircraft comprising a series of heating elements, each element consisting of at least two strips of thin conducting foil having perforations formed therethrough the strips being arranged parallel to one another side by side with a small insulating gap between them, means for electrically connecting one end of each strip to the proximate end of an adjacent strip, layers of electrically insulating material between which lie the strips of foil, the inner layer also being heat insulating, these layers adhering to the foil and being united to each other through the perforations in the foil, and means for connecting the ends of the strips which are not electrically connected to each other to a source of electric current so that the strips of foil act as resistance heating elements connected in series with one another, wherein certain of the heating elements lie adjacent to one another with a narrow strip-like heating element between them, and means are provided for connecting the narrow strip-like heating elements continuously to the source of electric current while the other heating elements are connected to such source in series at timed intervals.

JOHN KINSELLA.
ERNEST OWEN ROBERTSON.

REFERENCES CITED

The following references are of record in the file of this patent:

UNITED STATES PATENTS

| Number | Name | Date |
|---|---|---|
| Re. 21,474 | McCleary | June 4, 1940 |
| 449,036 | Capek | Mar. 24, 1891 |
| 567,248 | Meek | Sept. 8, 1896 |
| 1,321,462 | Line | Nov. 11, 1919 |
| 1,396,871 | Nagel | Nov. 15, 1921 |
| 1,553,868 | MacDonald | Sept. 15, 1925 |
| 1,632,651 | Hubbard | June 14, 1927 |
| 1,989,282 | Kimble et al. | Jan. 29, 1935 |
| 2,087,573 | Hamilton | July 20, 1937 |
| 2,165,970 | Jaspers | July 11, 1939 |
| 2,167,972 | Crawford | Aug. 1, 1939 |
| 2,205,543 | Rideau et al. | June 25, 1940 |
| 2,274,840 | Marick et al. | Mar. 3, 1942 |
| 2,393,100 | Gallay et al. | Jan. 15, 1946 |
| 2,393,635 | Hubbard | Jan. 29, 1946 |
| 2,406,367 | Griffith et al. | Aug. 27, 1946 |
| 2,496,279 | Ely et al. | Feb. 7, 1950 |
| 2,497,998 | Lee | Feb. 21, 1950 |

FOREIGN PATENTS

| Number | Country | Date |
|---|---|---|
| 625,116 | Great Britain | June 22, 1949 |
| 656,196 | Germany | Sept. 19, 1939 |